United States Patent
Antmen et al.

(10) Patent No.: US 11,973,732 B2
(45) Date of Patent: *Apr. 30, 2024

(54) MESSAGING SYSTEM WITH AVATAR GENERATION

(71) Applicant: Snap Inc., Santa Monica, CA (US)

(72) Inventors: Caner Berkay Antmen, Toronto (CA); Michal Dobrogost, Etobicoke (CA)

(73) Assignee: Snap Inc., Santa Monica, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 17/248,984

(22) Filed: Feb. 16, 2021

(65) Prior Publication Data
US 2021/0168108 A1 Jun. 3, 2021

Related U.S. Application Data

(63) Continuation of application No. 16/399,570, filed on Apr. 30, 2019, now Pat. No. 10,992,619.

(51) Int. Cl.
| | |
|---|---|
| *H04L 51/10* | (2022.01) |
| *G06F 18/214* | (2023.01) |
| *G06N 3/08* | (2023.01) |
| *G06V 40/16* | (2022.01) |

(52) U.S. Cl.
CPC ............ *H04L 51/10* (2013.01); *G06F 18/214* (2023.01); *G06N 3/08* (2013.01); *G06V 40/168* (2022.01)

(58) Field of Classification Search
CPC .. H04L 51/10; G06K 9/6256; G06K 9/00268; G06N 3/08
See application file for complete search history.

(56) References Cited

U.S. PATENT DOCUMENTS

| | | | |
|---|---|---|---|
| 5,880,731 | A | 3/1999 | Liles et al. |
| 6,023,270 | A | 2/2000 | Brush, II et al. |
| 6,223,165 | B1 | 4/2001 | Lauffer |
| 6,772,195 | B1 | 8/2004 | Hatlelid et al. |

(Continued)

FOREIGN PATENT DOCUMENTS

| | | |
|---|---|---|
| CN | 109863532 A | 6/2019 |
| CN | 110168478 A | 8/2019 |

(Continued)

OTHER PUBLICATIONS

Carlile et al., Improving Deep Learning By Inverse Square Root Linear Units (ISRLUs) [online]. ArXiv [retrieved on Sep. 21, 2022]. Retrieved from Internet <URL: https://www.semanticscholar.org/paper/Improving-Deep-Learning-by-Inverse-Square-Root-Carlile-Delamarter/1f9163789b549cc6f67e13f54c357317f62c90> (Year: 2018).*

(Continued)

*Primary Examiner* — William G Trost, IV
*Assistant Examiner* — Adam A Cooney
(74) *Attorney, Agent, or Firm* — Schwegman Lundberg & Woessner, P.A.

(57) ABSTRACT

A system comprises one or more processors of a machine and a memory storing instructions that, when executed by the one or more processors, cause the machine to perform operations. The operations comprise: receiving an image; generating an avatar with a trained neural network based on the image, the trained neural network predicting multiple trait values for the avatar; and sending a message with the generated avatar.

19 Claims, 13 Drawing Sheets

(56) References Cited

U.S. PATENT DOCUMENTS

| | | |
|---|---|---|
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,726,195 B2 | 5/2014 | Bill |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,992,619 B2 | 4/2021 | Antmen et al. |
| 2002/0067362 A1 | 6/2002 | Agostino Nocera et al. |
| 2002/0169644 A1 | 11/2002 | Greene |
| 2004/0190775 A1* | 9/2004 | Miller ............ G06V 20/647 |
| | | 382/103 |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0050286 A1 | 3/2012 | Yockey |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0044106 A1* | 2/2013 | Shuster ............ H04L 63/101 |
| | | 345/419 |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0129989 A1 | 5/2014 | Kim et al. |
| 2015/0206349 A1 | 7/2015 | Rosenthal et al. |
| 2015/0242707 A1* | 8/2015 | Wilf ............ G06F 18/2413 |
| | | 382/159 |
| 2016/0134840 A1 | 5/2016 | Mcculloch |
| 2016/0140435 A1* | 5/2016 | Bengio ............ G06N 3/045 |
| | | 382/158 |
| 2016/0234149 A1 | 8/2016 | Tsuda et al. |
| 2016/0307028 A1* | 10/2016 | Fedorov ............ G06T 11/60 |
| 2017/0080346 A1 | 3/2017 | Abbas |
| 2017/0087473 A1 | 3/2017 | Siegel et al. |

(56) References Cited

U.S. PATENT DOCUMENTS

| | | | |
|---|---|---|---|
| 2017/0113140 A1 | 4/2017 | Blackstock et al. | |
| 2017/0118145 A1 | 4/2017 | Aittoniemi et al. | |
| 2017/0199855 A1 | 7/2017 | Fishbeck | |
| 2017/0206795 A1 | 7/2017 | Kaleal, III | |
| 2017/0235848 A1 | 8/2017 | Van Deusen et al. | |
| 2017/0256086 A1* | 9/2017 | Park | G06T 7/73 |
| 2017/0287346 A1* | 10/2017 | Yadav | G09B 5/065 |
| 2017/0310934 A1 | 10/2017 | Du et al. | |
| 2017/0312634 A1 | 11/2017 | Ledoux et al. | |
| 2018/0047200 A1 | 2/2018 | O'hara et al. | |
| 2018/0113587 A1 | 4/2018 | Allen et al. | |
| 2018/0115503 A1 | 4/2018 | Baldwin et al. | |
| 2018/0268595 A1* | 9/2018 | Sarna | G06T 13/80 |
| 2018/0295092 A1* | 10/2018 | Peiris | G06Q 50/01 |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2019/0001223 A1 | 1/2019 | Blackstock et al. | |
| 2019/0005359 A1 | 1/2019 | Wilf et al. | |
| 2019/0012594 A1* | 1/2019 | Fukuda | G06N 3/04 |
| 2019/0057616 A1 | 2/2019 | Cohen et al. | |
| 2019/0065901 A1* | 2/2019 | Amato | G06F 18/24133 |
| 2019/0188920 A1 | 6/2019 | Mcphee et al. | |
| 2019/0325633 A1* | 10/2019 | Miller, IV | G06V 40/18 |
| 2019/0340419 A1* | 11/2019 | Milman | G06N 3/088 |
| 2019/0340763 A1* | 11/2019 | Laserson | G06F 18/2321 |
| 2020/0226381 A1* | 7/2020 | Wellen | G06V 10/82 |
| 2020/0351228 A1 | 11/2020 | Dobrogost et al. | |
| 2022/0284650 A1* | 9/2022 | Chand | G06T 19/20 |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

U.S. Appl. No. 16/399,570, filed Apr. 30, 2019, Messaging System With Avatar Generation.

"U.S. Appl. No. 16/399,570, Corrected Notice of Allowability dated Jan. 13, 2021", 4 pgs.

"U.S. Appl. No. 16/399,570, Examiner Interview Summary dated Aug. 4, 2020", 3 pgs.

"U.S. Appl. No. 16/399,570, Examiner Interview Summary dated Nov. 19, 2020", 3 pgs.

"U.S. Appl. No. 16/399,570, Final Office Action dated Jun. 25, 2020", 18 pgs.

"U.S. Appl. No. 16/399,570, Non Final Office Action dated Feb. 26, 2020", 18 pgs.

"U.S. Appl. No. 16/399,570, Non Final Office Action dated Oct. 19, 2020", 16 pgs.

"U.S. Appl. No. 16/399,570, Notice of Allowance dated Dec. 30, 2020", 10 pgs.

"U.S. Appl. No. 16/399,570, Response filed Mar. 24, 2020 to Non Final Office Action dated Feb. 26, 2020", 10 pgs.

"U.S. Appl. No. 16/399,570, Response filed Sep. 25, 2020 to Final Office Action dated Jun. 25, 2020", 8 pgs.

"U.S. Appl. No. 16/399,570, Response filed Dec. 8, 2020 to Non Final Office Action dated Oct. 19, 2020", 9 pgs.

Carlile, Brad, et al., "Improving Deep Learning By Inverse Square Root Linear Units (ISRLUs)", 8 pgs.

Lecun, Yann, et al., "Gradient-Based Learning Applied to Document Recognition", Proceeding of the IEEE, 86(11), (Nov. 1998), 2278-2324.

* cited by examiner

MESSAGING SYSTEM WITH AVATAR GENERATION

CROSS-REFERENCE TO RELATED APPLICATION

This application is a continuation of U.S. patent application Ser. No. 16/399,570, filed Apr. 30, 2019, which is incorporated by reference herein in its entirety.

TECHNICAL FIELD

The present disclosure relates to messaging systems, and particularly, but not exclusively, to training a neural network to generate user avatars based on user images.

BACKGROUND

Avatars are graphical representations of users used in computing systems, such as video games, messaging systems, Internet forums, etc. Avatars can be used to graphically identify a message sender. Typically, users can select an avatar from a preset list or upload an avatar image. Alternatively, users can design their own avatars.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Given a self-image ("selfie"), a trained neural network can generate an avatar. Generating an avatar comprises selecting a specific value for each facial trait, for example "black" hair tone, "short-straight" hair style, "wide" nose style, etc. There are over 20 traits that can be changed in addition to selecting two genders: male or female. Further, there are multiple avatar styles. Each style will have a different set of traits that can be changed and different looking values for each trait.

Figure 1:
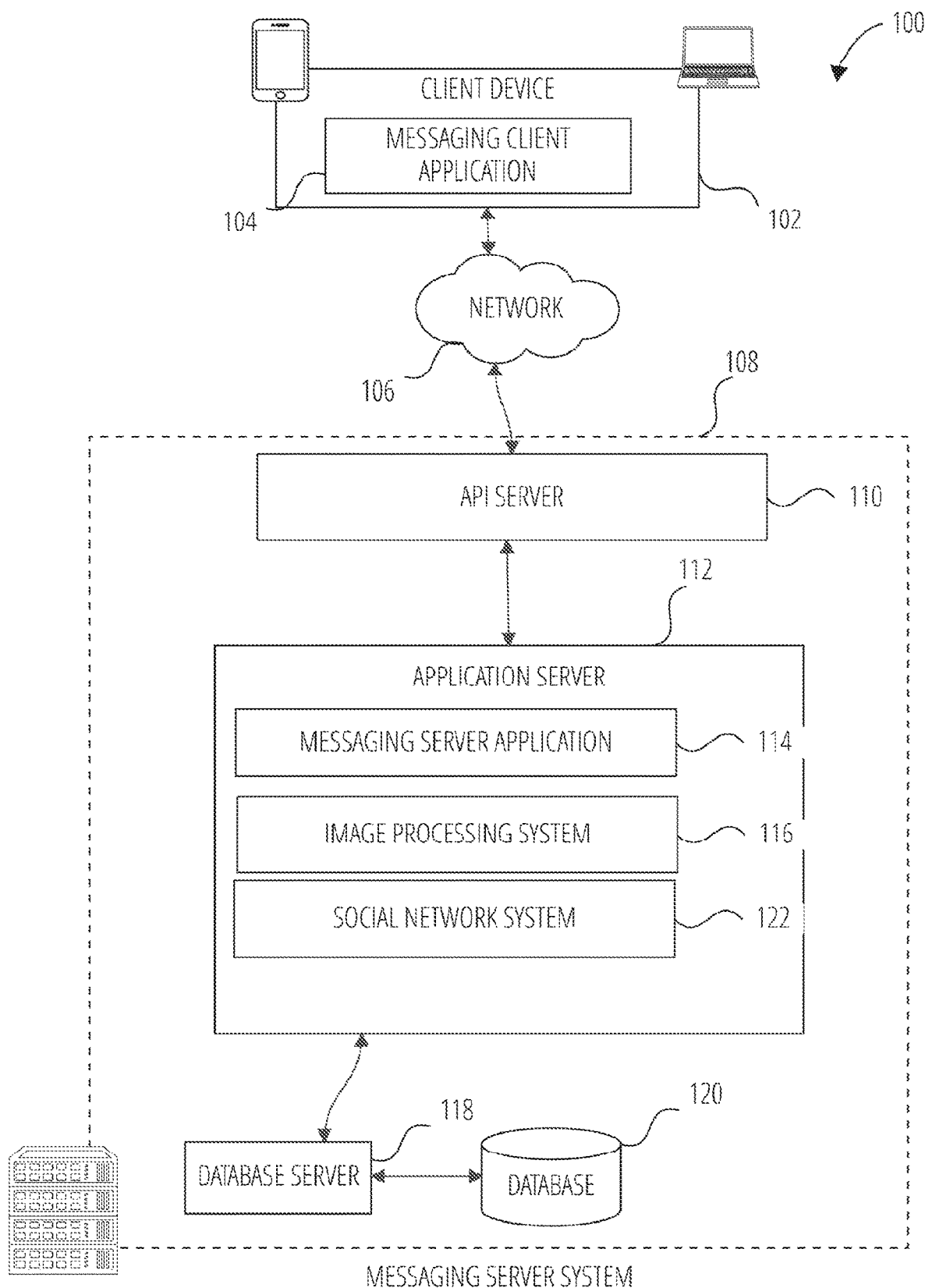
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
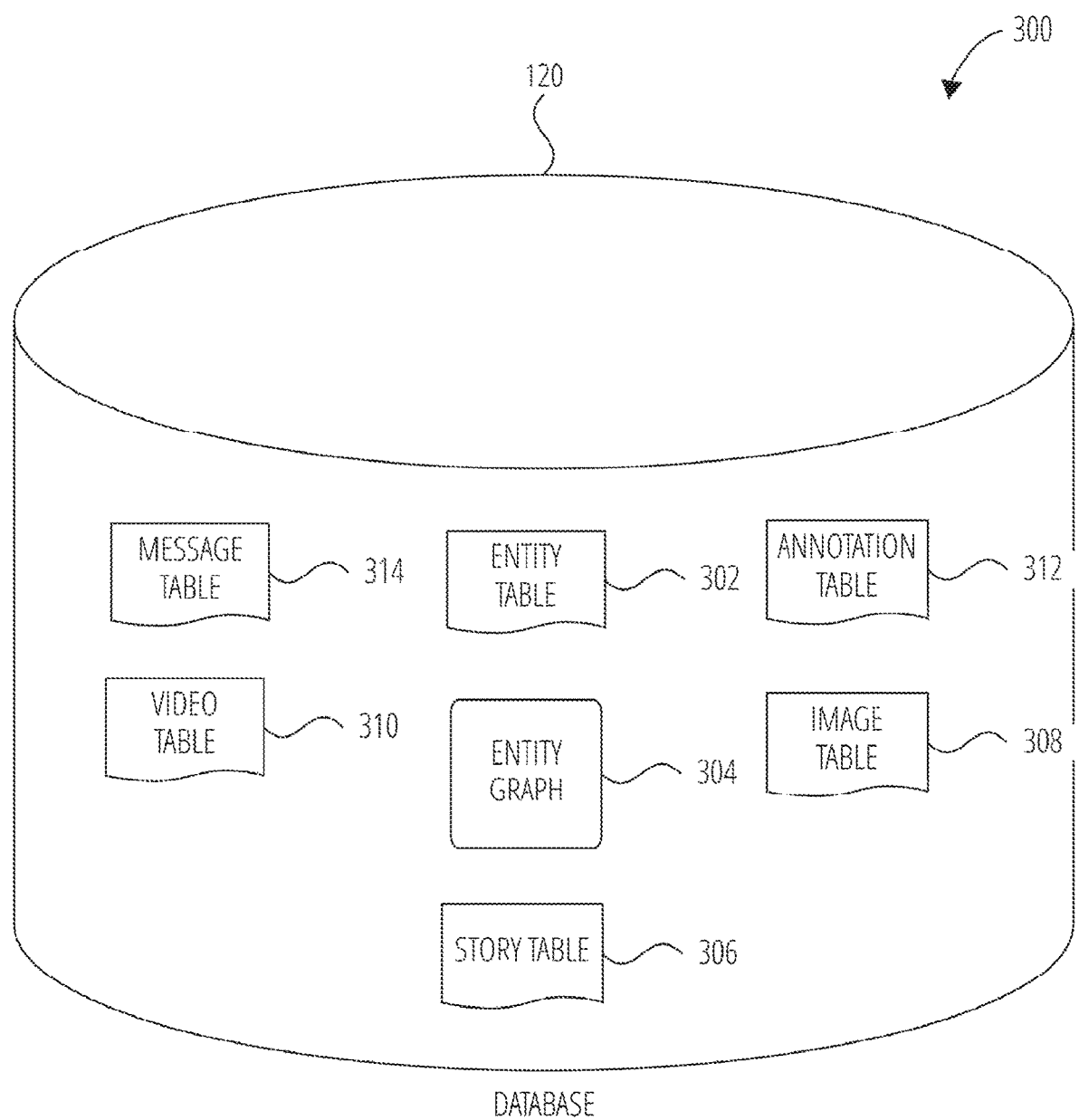
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Figure 2:
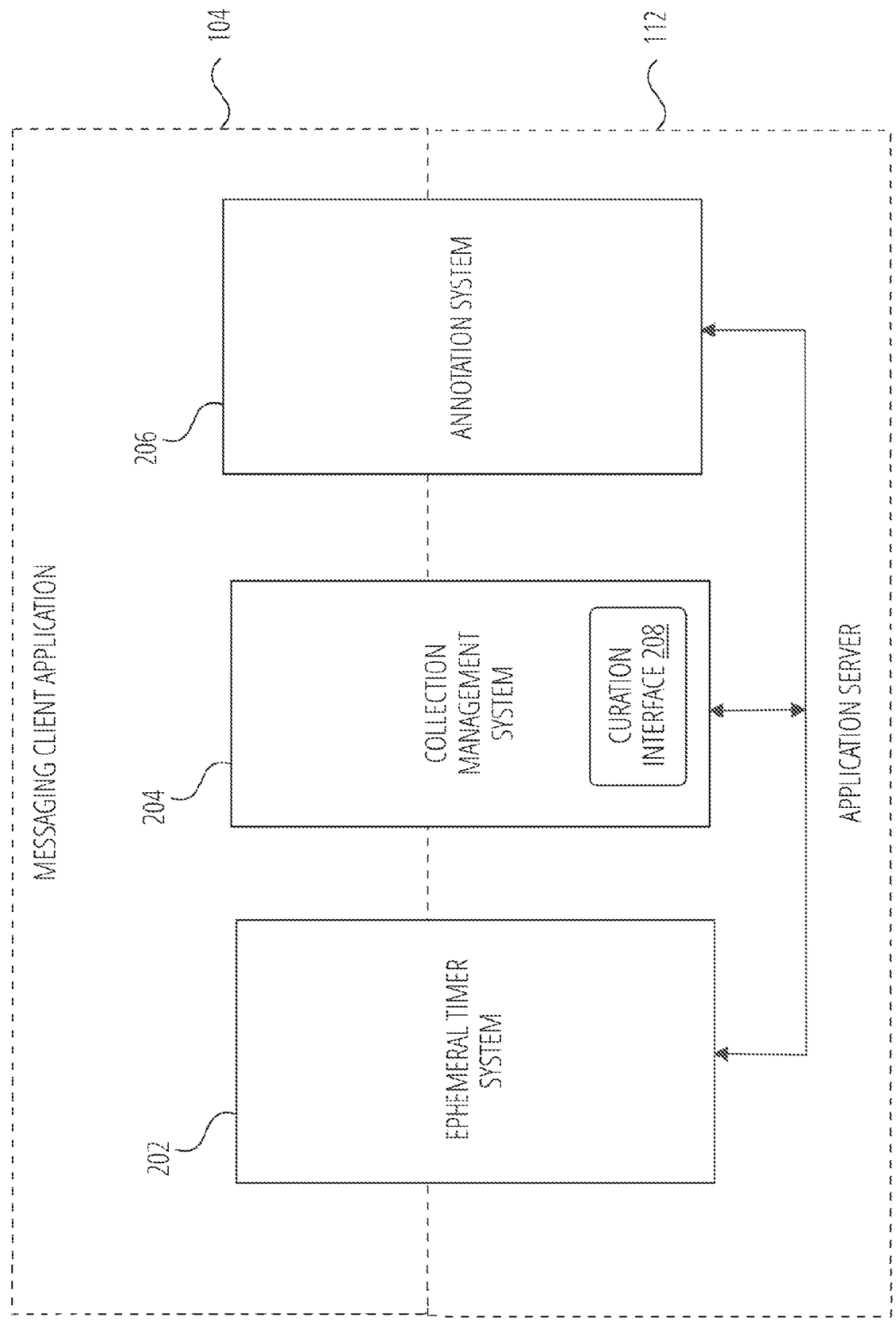
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection, In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
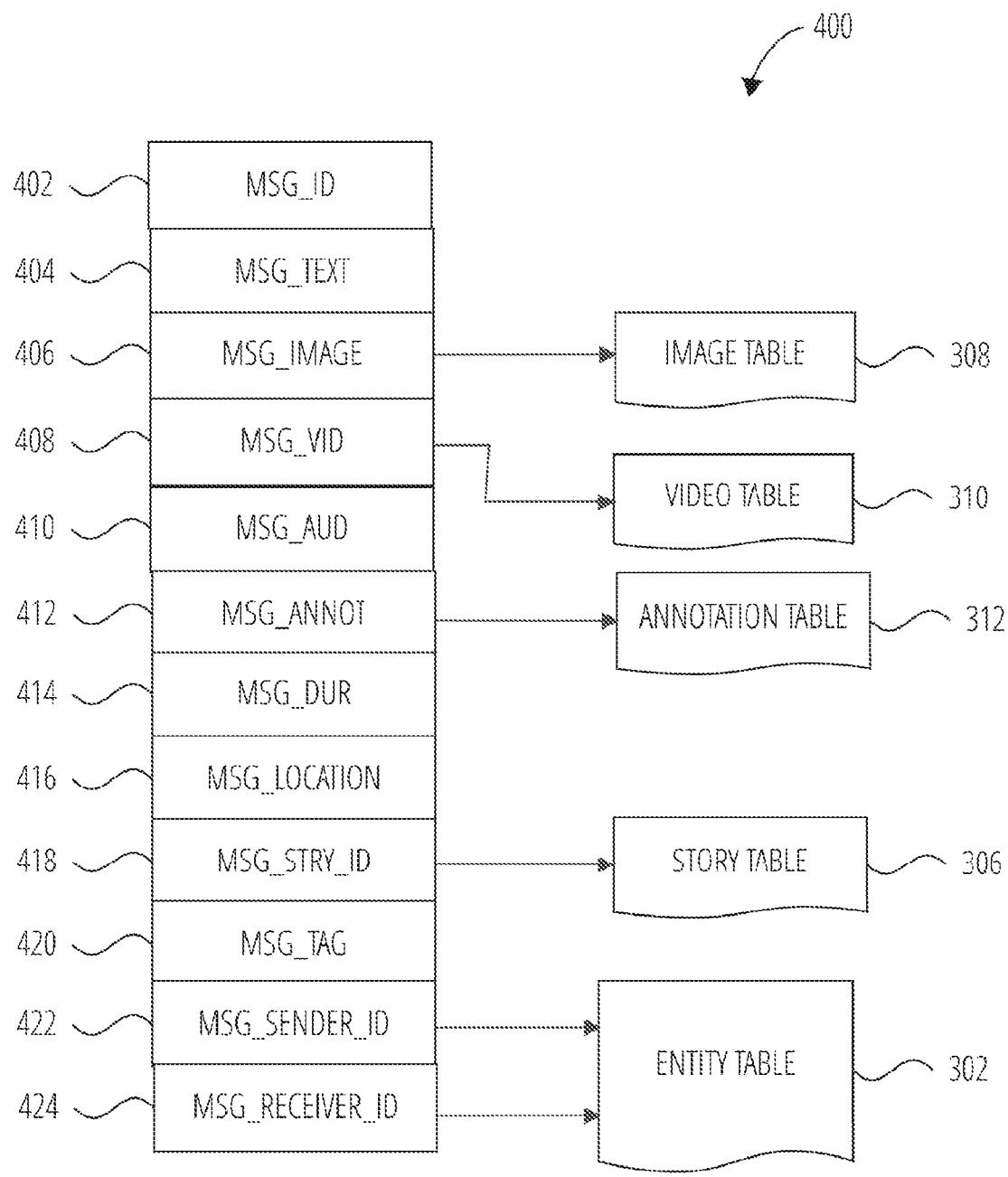
FIG. 4 is a diagrammatic representation of a message, in accordance with some example embodiments.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from a memory component of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
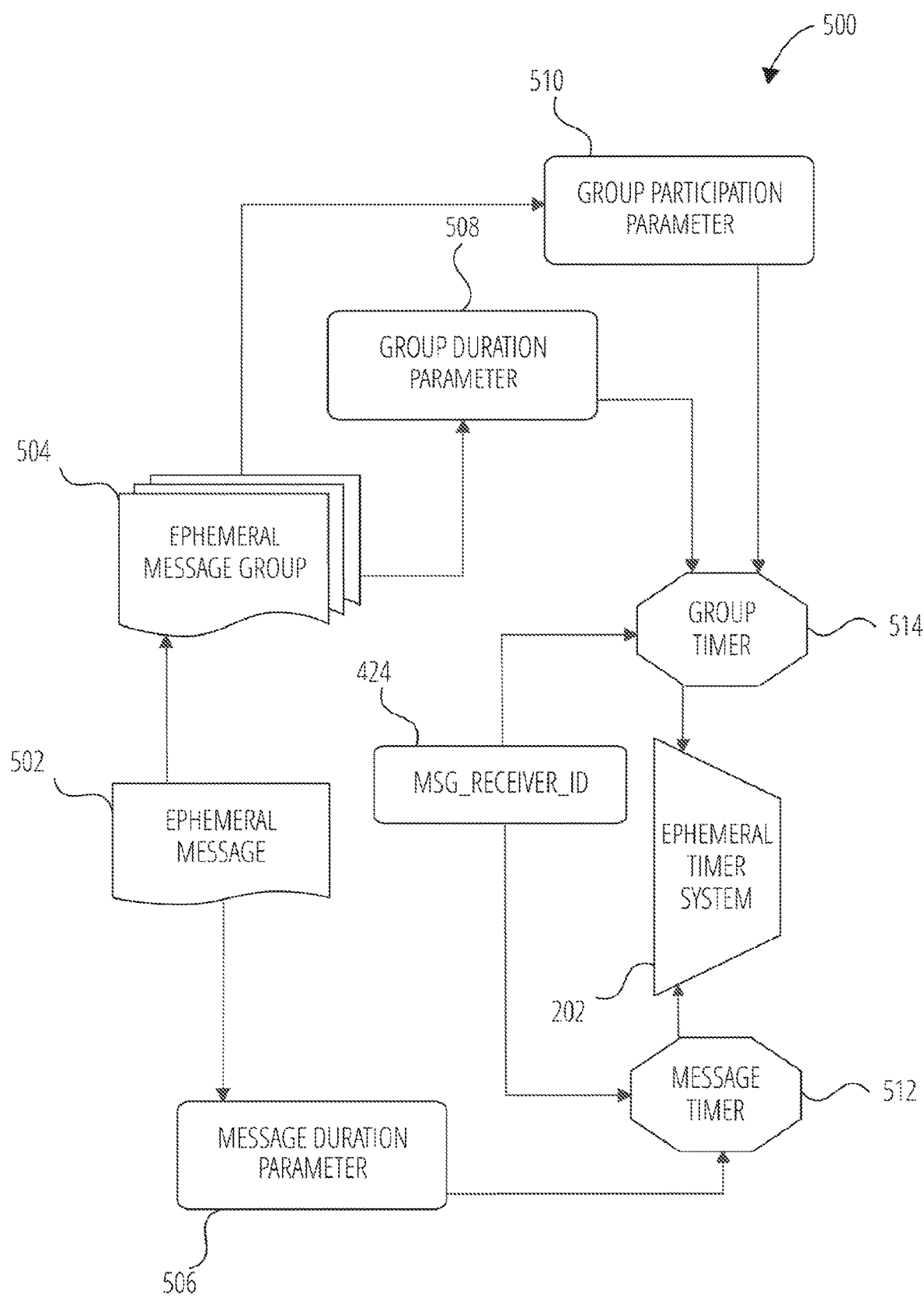
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504, In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
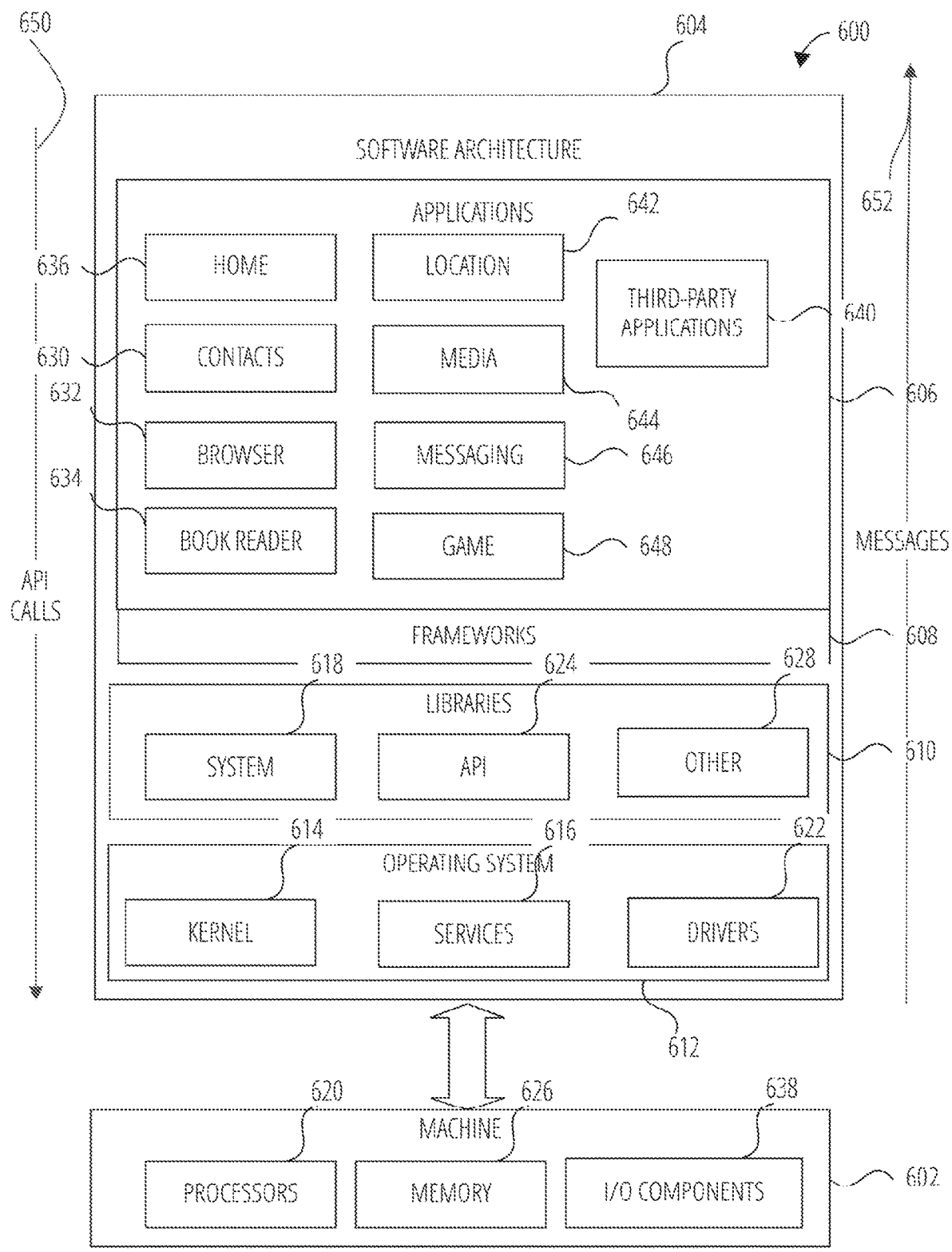
FIG. 6 is block diagram showing a software architecture within which the present disclosure may be implemented, in accordance with some example embodiments.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionality. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 610 provide a low-level common infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a high-level common infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example embodiment, the applications 606 may include a home application 636, a contacts application 630, a browser application 632, a book reader application 634, a location application 642, a media application 644, a messaging application 646, a game application 648, and a broad assortment of other applications such as third-party applications 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party applications 640 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 640 can invoke the API calls 650 provided by the operating system 612 to facilitate functionality described herein.

Figure 7:
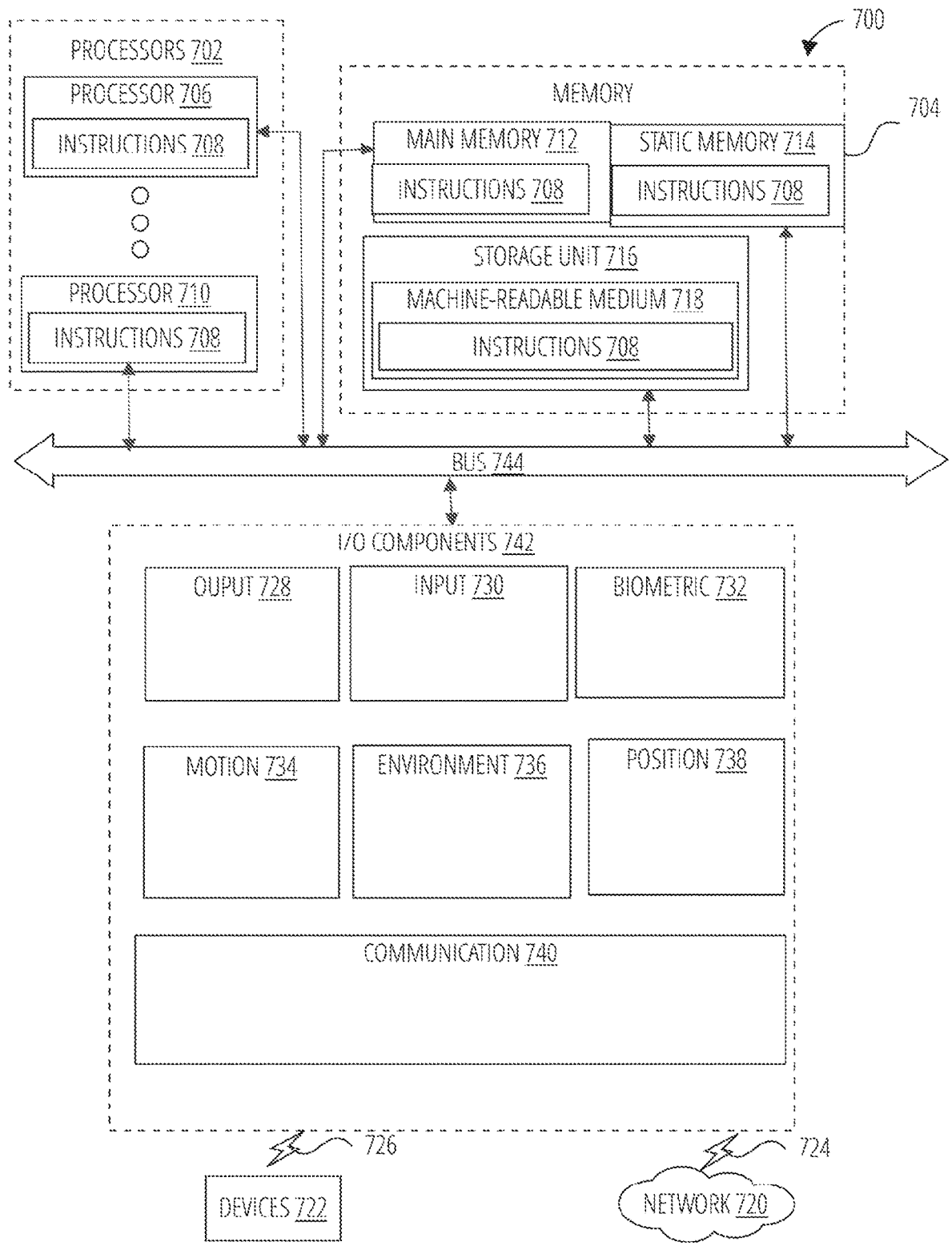
FIG. 7 is a diagrammatic representation of a machine, in the form of a computer system within which a set of instructions may be executed for causing the machine to perform any one or more of the methodologies discussed, in accordance with some example embodiments.

FIG. 7 is a diagrammatic representation of a machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein.

The machine 700 may include processors 702, memory 704, and I/O components 742, which may be configured to communicate with each other via a bus 744. In an example embodiment, the processors 702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single core, a single processor with multiple cores (e.g., a multi-core processor), multiple processors with a single core, multiple processors with multiples cores, or any combination thereof.

The memory 704 includes a main memory 712, a static memory 714, and a storage unit 716, both accessible to the processors 702 via the bus 744. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the processor's cache memory), or any suitable combination thereof, during execution thereof by the machine 700.

The I/O components 742 may include a wide variety of components to receive input, provide output, produce output, transmit information, exchange information, capture measurements, and so on. The specific I/O components 742 that are included in a particular machine will depend on the type of machine. For example, portable machines such as mobile phones may include a touch input device or other such input mechanisms, while a headless server machine will likely not include such a touch input device. It will be appreciated that the I/O components 742 may include many other components that are not shown in FIG. 7. In various example embodiments, the I/O components 742 may include output components 728 and input components 730. The output components 728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 742 may include biometric components 732, motion components 734, environmental components 736, or position components 738, among a wide array of other components. For example, the biometric components 732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 include location sensor components (e,g,, a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/C) components 742 further include communication components 740 operable to couple the machine 700 to a network 720 or devices 722 via a coupling 724 and a coupling 726, respectively. For example, the communication components 740 may include a network interface component or another suitable device to interface with the network 720. In further examples, the communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities, The devices 722 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting an NFC beacon signal that may indicate a particular location, and so forth.

The various memories (e.g., memory 704, main memory 712, static memory 714, and/or memory of the processors 702) and/or storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed embodiments.

The instructions 708 may be transmitted or received over the network 720, using a transmission medium, via a network interface device (e.g., a network interface component included in the communication components 740) and using any one of a number of well-known transfer protocols (e.g., hypertext transfer protocol (HTTP)). Similarly, the instructions 708 may be transmitted or received using a transmission medium via the coupling 726 (e.g., a peer-to-peer coupling) to the devices 722.

Figure 8:
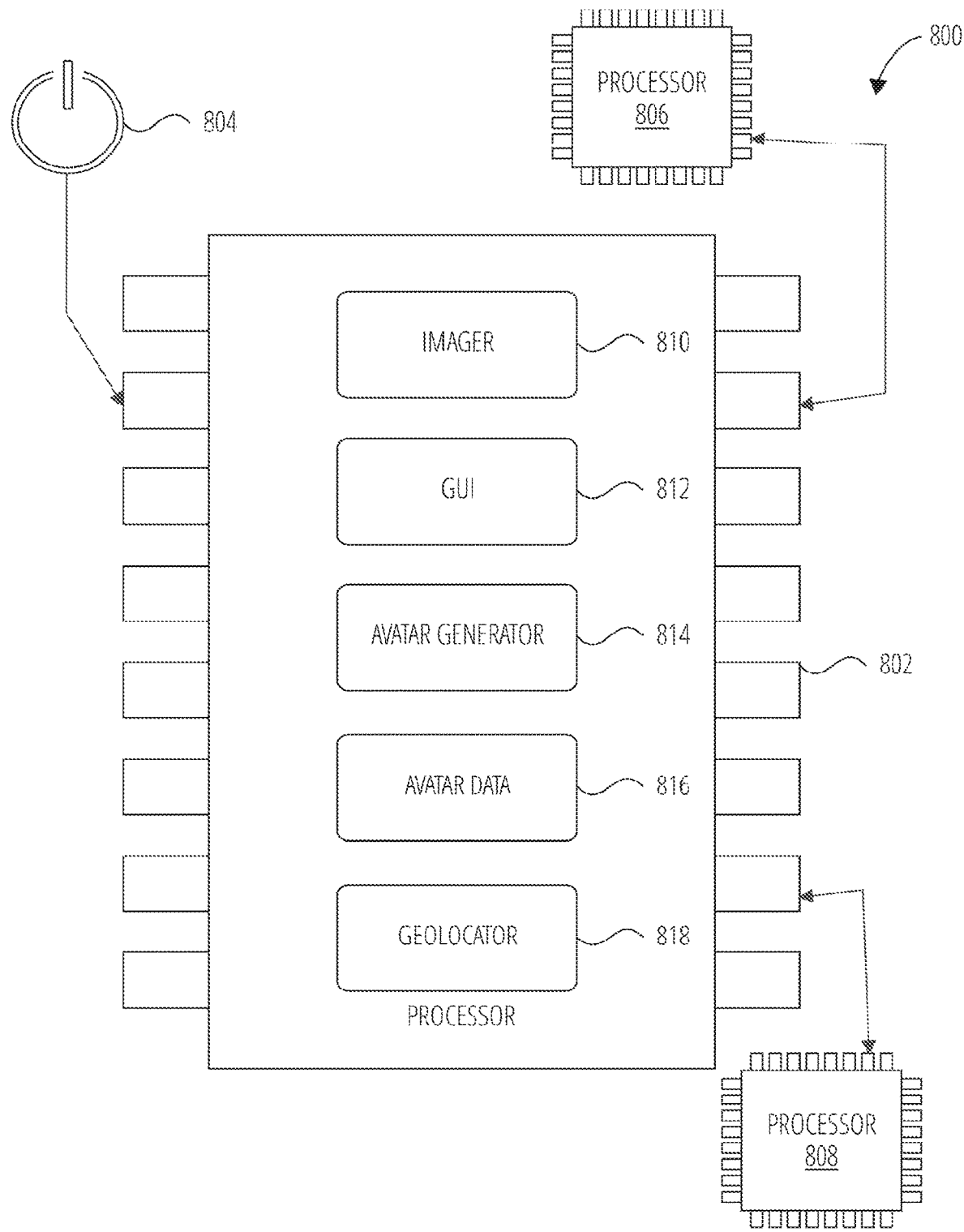
FIG. 8 is a diagrammatic representation of a processing environment, in accordance with some example embodiments.

Turning now to FIG. 8, there is shown a diagrammatic representation of a processing environment 800, which includes the processor 806, the processor 808, and a processor 802 (e.g., a GPU, CPU or combination thereof).

The processor 802 is shown to be coupled to a power source 804, and to include (either permanently configured or temporarily instantiated) modules, namely an Imager 810, a graphical user interface GUI 812, an Avatar Generator 814; Avatar Data 816 and a Geolocator 818. The Imager 810 operationally captures a self-photograph ("image") of the user, the GUI 812 operationally generates a user interface for a user to interact with the Avatar Generator 814, and the Avatar Generator 814 operationally generates an avatar using the self-photograph and the avatar data. During a training phase, the Geolocator 818 sends geolocation to a neural network 900 (FIG. 9) as will be discussed further below. During the training phase, the user can generate an avatar with the Avatar Generator 814. The generated avatar, self-photograph and location determined by the Geolocator 818 it then sent to the neural network 900 for training. This can be repeated for multiple users (hundreds to millions or more) to ensure appropriate training data for the neural network 900. Training of the neural network 900 will be discussed in further detail in conjunction with FIG. 9-FIG. 11.

Once the neural network 900 is trained, the processing environment 800 receives Avatar Data 816 from the neural network 900. The Avatar Data 816 includes predicted avatar values for each facial trait and gender. The Avatar Data 816 can also include different predicted avatar values for each facial trait based on location of the user as indicated by the Geolocator 818. The Avatar Data 816 may also include different predicted values based on avatar style. The Avatar Generator 814 then generates an avatar for a user based on the Avatar Data 816 and a photograph of the user. The Avatar Generator 814 can also base the avatar generation based on location and avatar style (e.g., Bitstrips, Bitmoji Classic, Bitmoji Deluxe) selected by a user. Alternatively, the Avatar Generator 814 transmits the photograph to the trained neural network 900 to generate the avatar. Alternatively, the Avatar Generator 814 includes the trained neural network 900 and performs avatar generation locally.

Figure 9:
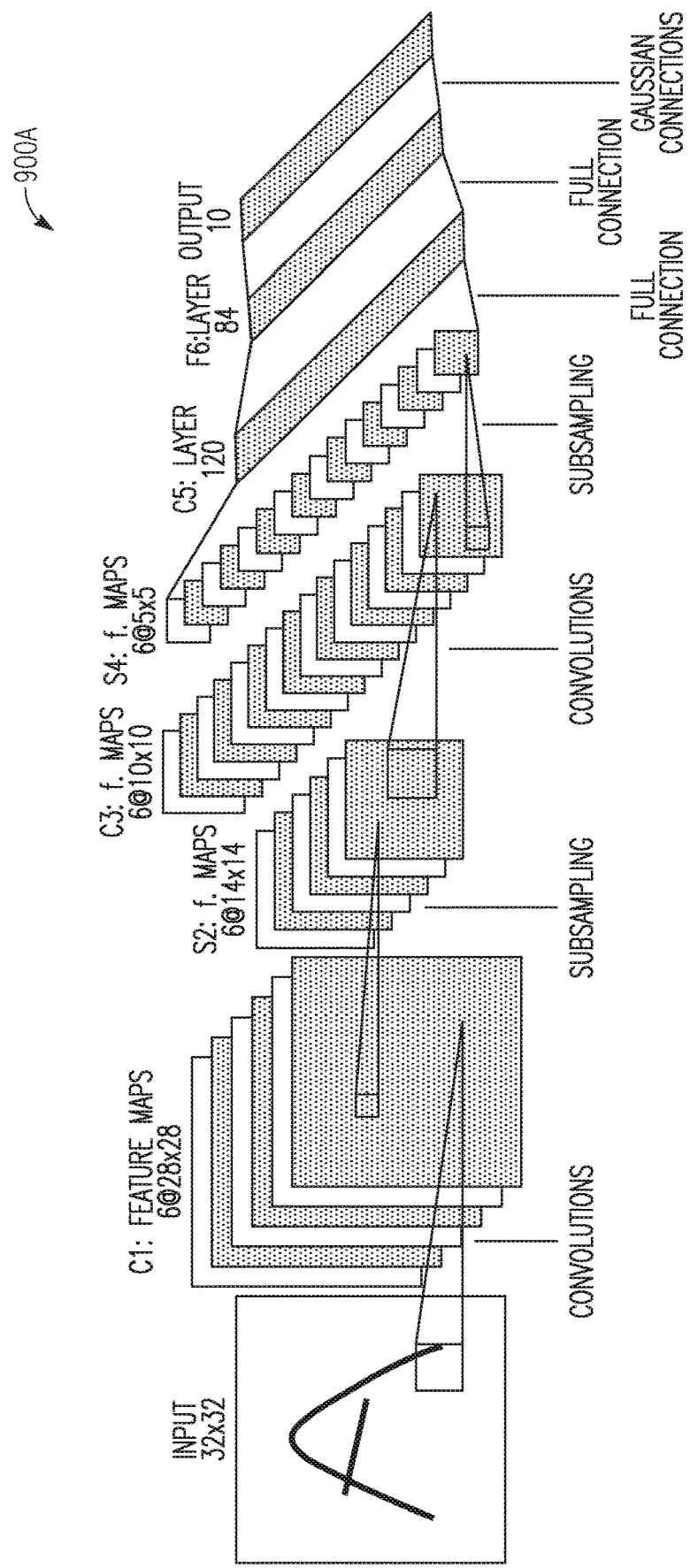
FIG. 9 illustrates a neural network in accordance with one embodiment.

FIG. 9 illustrates a neural network 900 in accordance with one embodiment. The neural network 900 trains on and predicts multiple trait values in a single neural network. This corresponds to having multiple dimensions of classes to predict. Further the neural network 900 uses dynamic balancing of the dataset at training time independently across multiple traits and performs dynamic filtering of the dataset at training time independently across multiple traits. The neural network 900 allows for decomposition of traits into subtraits and incorporates a transfer learning methodology to retrain the neural network 900 on a limited dataset when the set of traits or the set of trait values changes.

The neural network 900 collects a dataset of hundreds to tens of millions or more of self-images taken by users and the avatars that they designed. The neural network 900 is modeled as a classification problem across multiple dimensions (traits). The neural network 900 shares bottom layers ("close" to the pixels of the image) with an open source neural network (e.g., mobilenet) but replaces the top classification layers with a fanout of top classification. layers ("close" to the predicted avatar trait values). This reduces the neural network size and while increasing speed of execution which is a requirement for running the inference on smartphone devices.

However, the dataset can be very noisy. Problems include "fantasy" avatars that do not resemble the face in the self-image or "partial" avatars that were poorly designed by un-engaged users. Accordingly, the dataset if filtered by removing "partial" avatars based on the number of traits the user changed from the default avatar. Further, the values for any given trait are unbalanced. This means that there are wildly popular and wildly unpopular hairstyles and also hairstyles in between. It would be easy for the neural network 900 to learn to always predict the most popular hairstyle and be right most of the time.

The neural network 900 applies balancing across multiple dimensions. Duplication may not work because different traits would specify a different duplication schedule. Multiplying gradients by the inverse frequency caused other problems:

Unpopular trait values would be over predicted. Instead, neural network 900 multiplies gradient by square root of inverse frequency instead.

Dynamically filter out trait values that are wildly unpopular. Accordingly, wouldn't propagate a gradient across certain paths of the fan out while still propagating the gradient across other paths. This minimizes reducing the training dataset exorbitantly, otherwise filtering on a single data item (photograph & avatar trait values) would cause overfiltering. Some users do not put much effort into designing their avatar which causes us to collect noisy training data which encourages predictions close to the default avatar regardless of the contents of the selfie image. To resolve this issue any training data item that contains the default value for any of these traits gets filtered out of the training dataset: skin tone, hair style, pupil tone.

Loss function normalization per class has to be done carefully because effective learning rate should stay relatively constant. Naive methods of class balancing can dramatically increase or decrease the learning rate. In the neural network 900 the expected learning rate per batch is equal to the intended learning rate.

Dynamic filtering is performed by removing (1) infrequently used trait values/classes as well as (2) classes that we have found to be problematic—for example avatar sunglasses tend to be used without regard to whether the photograph is shown wearing sunglasses or not.

Because filtering is performed across all traits, removal of the data item would result in the removal of a large portion of the training data (since only one trait value being filtered would result in the whole avatar & photograph to be removed), To prevent this the filtering is done dynamically, at training time, and independently for each trait. This means that if a single trait is filtered, it will not influence the training of the neural network for that avatar & photograph but non-filtered traits will continue to influence training.

The list of classes for each trait to be filtered is computed before training starts:
1. Infrequent trait values: If a trait value occurs times in the training data set it will be marked for dynamic filtering if where is the number of items any value for that trait occurs in the training data and is the number of values for that trait. Note that many other filtering conditions could be used.
2. Blacklisted traits: There is an explicit black list of trait values to be marked for dynamic filtering.

In both cases the balancing weights for the trait values marked for dynamic filtering are set to 0. This makes the gradient for that branch of the fanout 0 which prevents that branch of the fanout, corresponding to the trait with the value that was dynamically filtered out, to not contribute to training for that avatar & photograph.

For dynamic balancing, each trait (e.g., hair tone) can take on one of multiple values/classes (e.g., dark brown). Because some hair colors are much more popular than others the classifier could learn to predict the most popular class and be right most of the time. To address this a weight multiplier for each class is calculated and applied during training. This causes the neural network training to take larger steps for less frequent classes (i.e less frequent implies there will be fewer relevant steps encountered).

The formula for computing the balancing weight multiplier ($nw_c$) is as follows:

| | |
|---|---|
| $nw_c = \dfrac{w_c}{w \cdot p}$ | Normalization ensures that the learning rate stays constant across all traits. This is based on the following formula for expect learning rate $E[\alpha] = \Sigma_c\, p_c w_c$ and to keep the learning rate constant $E[\alpha] = 1$. |
| $w_c = \dfrac{1}{\sqrt{p_c}}$ | Non-normalized weight is inversely proportional to the probability of a given value/class. Using $\dfrac{1}{p_c}$ overcompensates and less frequent values/classes dominate more frequent ones. |
| $p_c = \dfrac{f_c}{\Sigma_c f_c}$ | The probability of a given value/class as computed from class frequencies encountered in the training dataset for a given trait. |

The neural network 900 decomposes each trait into multiple subtraits. This increases the training data for each trait and reduces the answer space. For example, jaw style is decomposed into jaw shape style (U shaped, V shaped, Double chin) and jaw width (narrow, medium, wide). :A trait value corresponds to one class to be classified. For example, the trait "jaw" may have values "u-narrow", "u-wide", "v-narrow" and "v-wide" and each one of these is a class that can be predicted.

One trait (e.g., jaw) can be decomposed into multiple subtraits and the neural network 900 can train on subtraits instead of or in addition to traits. For example, jaw style can be decomposed to jaw shape style (U shaped, V shaped, Double chin) and jaw width (narrow, medium, wide). This increases the training data for each trait and reduces the answer space.

For example, the answer space for jaw would have 9 classes: u-narrow, u-medium, u-wide, v-narrow, v-medium, v-wide, double-narrow, double-medium, double-wide. However, decomposing yields 3+3 classes across two subtraits. Jaw-style: u,v,double and jaw-width: narrow, medium, wide. Even though multiplying these two yeilds 9 the neural network 900 can sometimes do a better job on the subtrait prediction.

Distribution of traits is shown below. The data is listed as "trait name" "number of values for the least represented class", "number of values for the most represented class". This was generated on a sample of the data so the counts are not representative of the size of the training data but are relatively correct to compute the relative frequency of a given value/class.

jaw/name 1578 21043
jaw/chin-type 5781 33483
hair/type 6240 28912
glasses/id 2 20660
eye/asian-eye 6103 49706
eye size/id 11172 20064
face_proportion/id 1894 32508
eye/lid-type 7019 38204
eye/skew 6250 38324
brow/name 323 27350
brow_tone/id 6 12780
skin tone/id 6 20352
hair/length 758 24438
nose/size 7452 29801
nose/name 83 29463
hair tone/id 10 9863
hair/id 13 3475
pupil_tone/id 174 22263
mouth/lips 10379 24285
blush_tone/id 4 5819
beard/id 17 26496
eye_spacing/id 3746 39344
beard_tone/id 4 16691
brow/thickness 5349 27837
hair/special 146 146
eye/height 26793 29016

The neural network 900 uses transfer learning to handle new art releases, e.g., keeping the neural network 900 up-to-date: atop layer is reconstructed to handle new classes and the bottom layer weights are kept the same. In this setup, the learning rate for the top layer is set to our usual learning rate while the bottom layer learning rate can be up about 100 times smaller. Afterwards, the new neural network 900 is trained only on the new dataset. This enables: shorter training time because we are only training on the new dataset which is significantly smaller; and conflicts between the new and the old data are avoided. An example to this conflict: after a new "Eye" release, users with similar looking eyes may now begin picking the new eye option, while in the old dataset that option does not exist.

Squashing the values between 0 and 1 was no worse than mean and std normalization (most likely because we use batch norm).

In the neural network 900, facial detection is done before training. An input image is shown from the left and goes through convolutions, subsampling, convolutions, more subsampling, full connections, Gaussian connections and then output. A convolution neural network (e.g., mobilenet) can be used prior to the full connection layers. There is one fully connected layer for each trait or dimension (see FIG. 11).

The input would be an image of the cropped faced. The neural network 900 then learns the subsequent layer which is an image feature extractor layer (eg. "vertical line" or "blue"). The neural network 900 will then also learn all the intermediate layers that become more and more abstract the further you go (eg. "large eyes", "small eyes") until it final predicts the output (eg. "bitmoji eye style 1" or "bitmoji eye style 2").

Each layer (e.g., C1) is transformed into the following layer (eg. S2) by essentially a matrix multiplication and a nonlinear function. Each matrix entry is called a weight as are any parameters of the nonlinear function (e.g., the slope). Weights are floating point numbers like 0.1 or −5.1. Bottom weights would correspond to the weights of the bottom layers of the network. The weights are randomly initialized and automatically learned by the training process.

Figure 10:
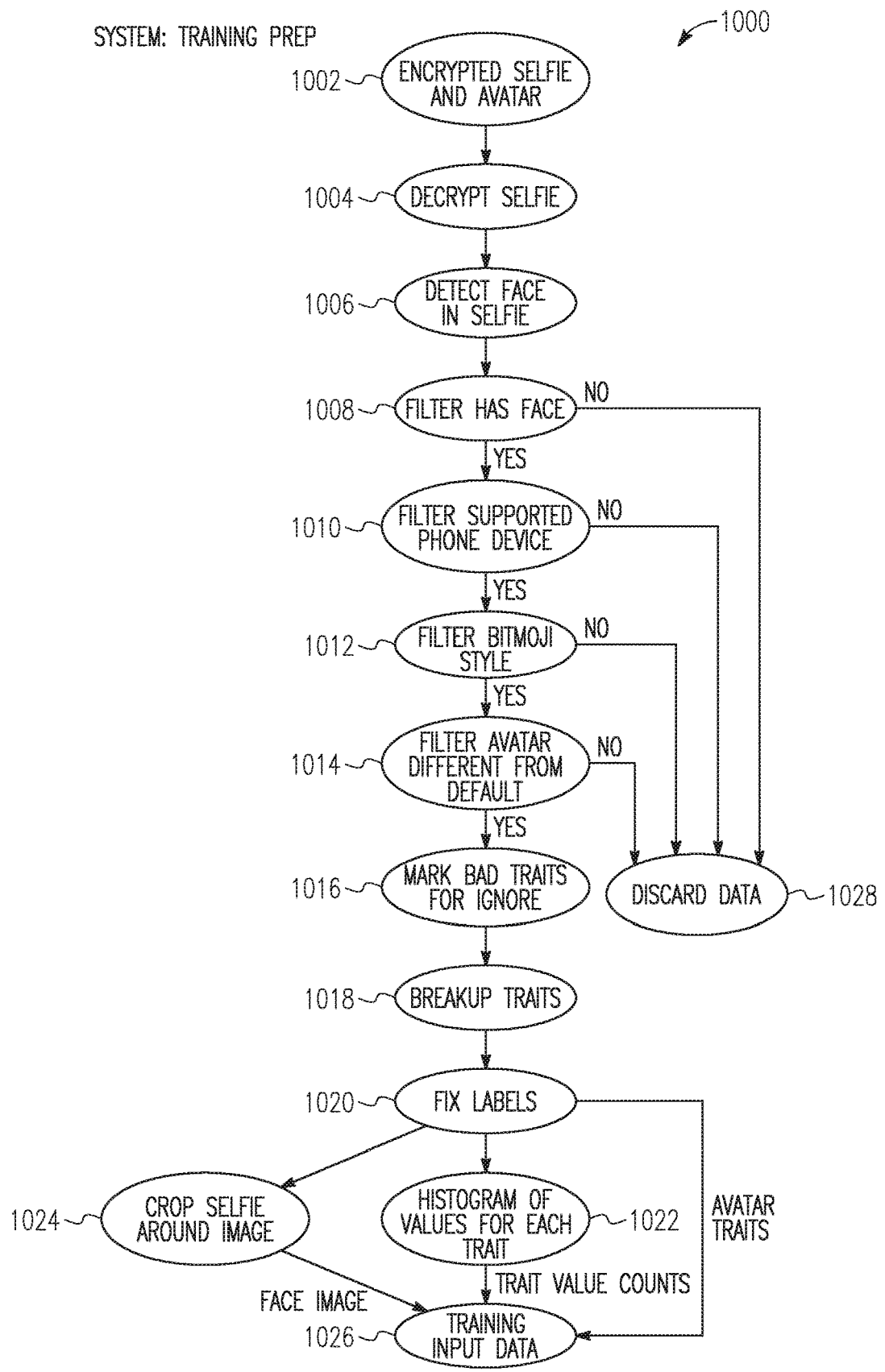
FIG. 10 illustrates a method of pretraining in accordance with one embodiment.

FIG. 10 illustrates a method of pretraining 1000 in accordance with one embodiment. First, an encrypted photograph and user-designed avatar is received (1002). The photograph is decrypted (1004) and a face, if any in the photograph, is detected (1006). If (1008) there is no face, then the data is discarded (1028). Otherwise, if (1010) a phone that took the photograph is not supported, the data is also discarded (1028). Data is also discarded (1028) if the avatar style is not supported (1012). Finally, data is also discarded (1028) if the user-design avatar is not sufficiently different (1014) from a default avatar. If the data is not filtered (1008-1014), then. bad traits are ignored (1016), e.g., for sunglasses in avatar when sunglasses are not present in the photograph. Then traits are broken up into substraits (1018) and labels affixed (1020). The photograph is cropped (1024) so that only the face is shown, a histogram of values for each trait is updated (1022) and then added (1026) to training data for the neural network 900.

Figure 11:
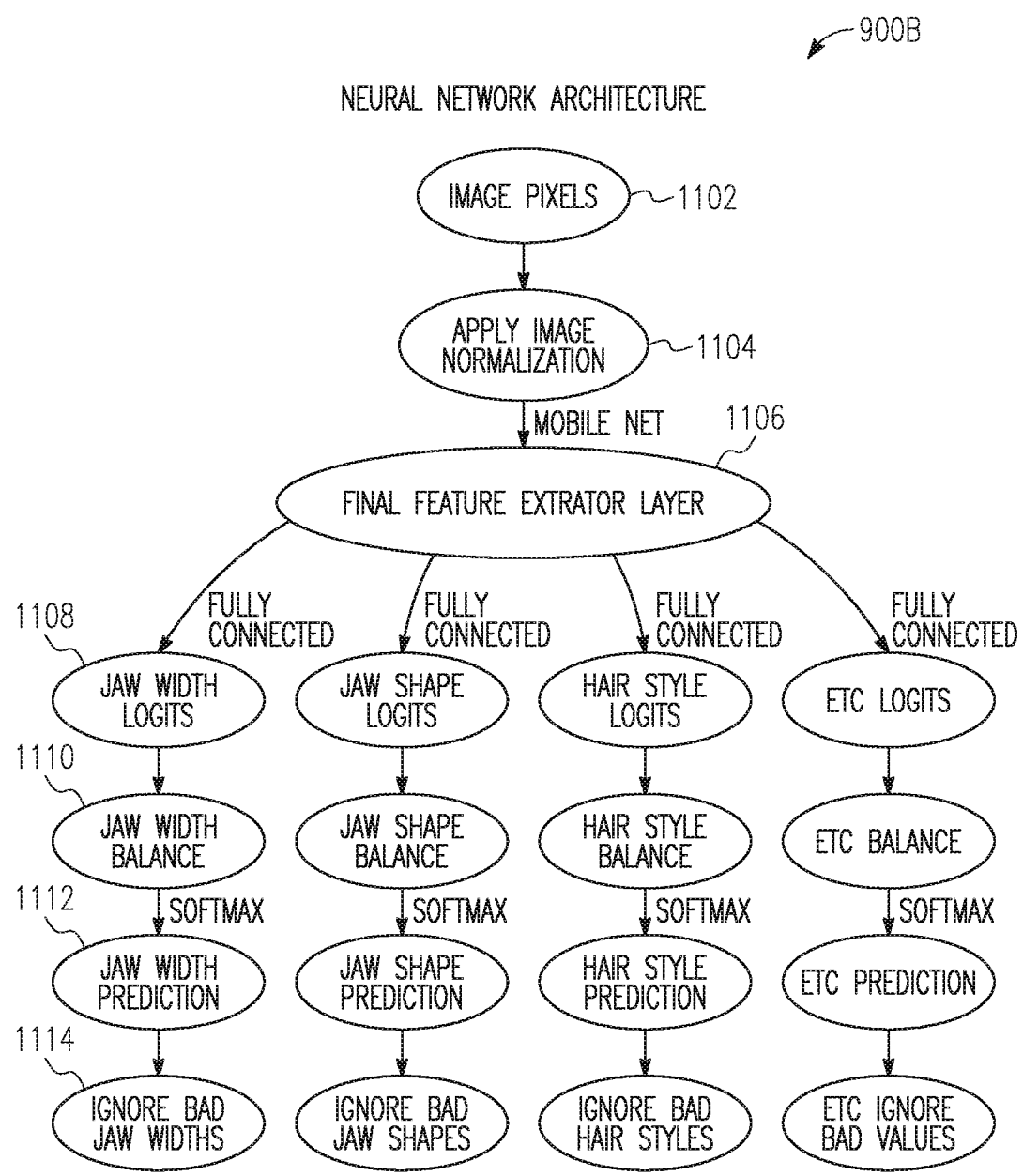
FIG. 11 illustrates a method of neural network training in accordance with one embodiment.

FIG. 11 illustrates a method of neural network training 1100 in accordance with one embodiment. First, image pixels 1101 are received and normalized (1104). Then a convolutional neural network operates on the images to the extractor layer (1106). The fully connected layers then train on the subtraits, such as jaw width (1108), jaw shape, hair style, etc. The fully connected layers will proceed through logits (1108), balance (1100), prediction (1112) and ignore (1114) had data.

Figure 13:
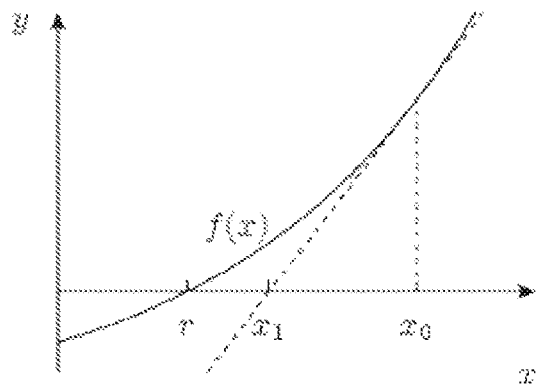
FIG. 13 illustrates a learning rate parameter curve.

Neural network 900 training is done via gradient descent optimization. At a given step the network weights are set to some value. The gradient is computed based on the difference between what the network predicted and the actual avatar the user created. A step is then taken in the direction to minimize this difference. The size of this step is modulated by the learning rate parameter as shown in curve 1300 in FIG. 13.

In the context of transfer learning the bottom layers are trained with a smaller learning rate meaning that the network weights for the bottom layers are changed more slowly (smaller steps) than the top layers. The top layers are being training from scratch as the structure of the network top layers changes when new trait values are introduced.

The neural network 900 uses the following parameters for training:
default_adam_params={
"learning_rate": 0.001,
"beta1": 0.9,
"beta2": 0.999,
"epsilon": 1e-08,
}

Figure 12:
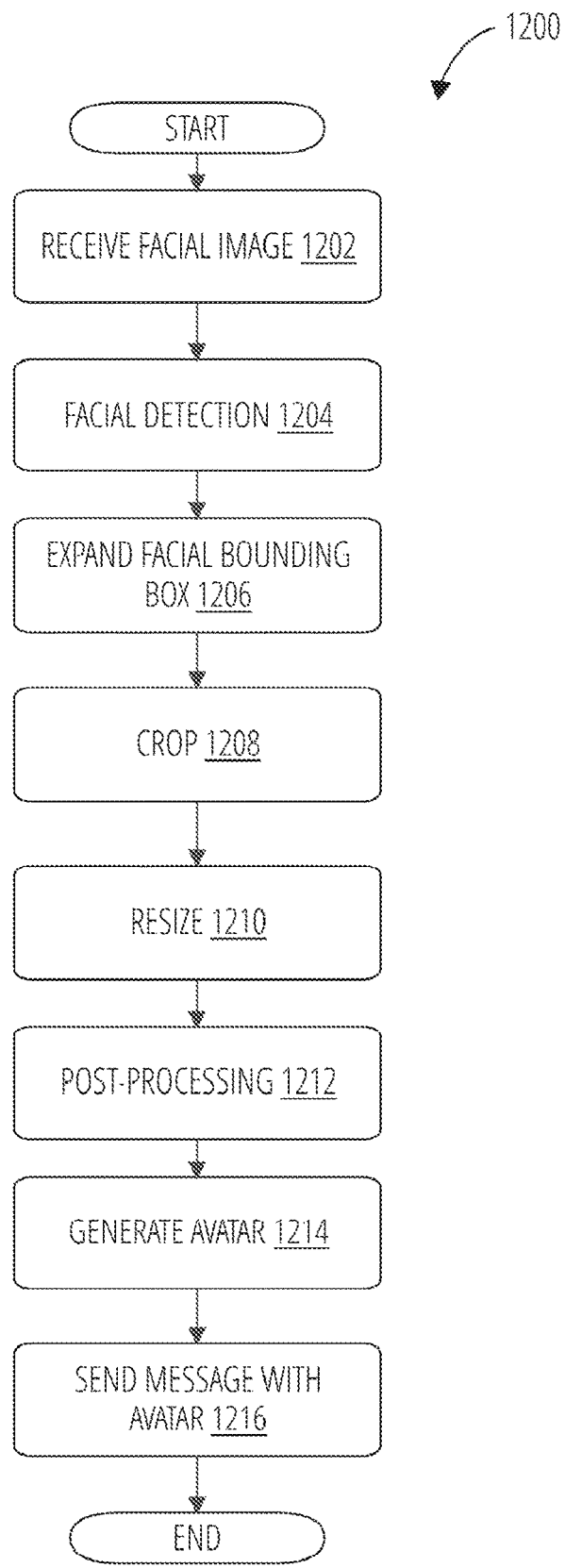
FIG. 12 illustrates a method of generating an avatar in accordance with one embodiment.

FIG. 12 illustrates a method of generating an avatar 1200 in accordance with one embodiment. After the neural network 900 is trained, the trained neural network 900 can reside on a user device (e.g., client device 102) and/or server (e.g., messaging server system 108 or elsewhere). The Imager 810 receives (1206) a facial image (e.g.; self-photograph, selfie, etc.) and then the neural network 900 generates (1208) and avatar. The client device 102 can then transmit a message (e.g., ephemeral message 502) with the generated avatar associated with it.

Accordingly, embodiments provide a way to automatically generate an avatar and therefore enable graphically identifying message senders. Example embodiments include:

1. A machine-implemented example method of transmitting a message, comprising:
receiving an image;
generating an avatar with a trained neural network based on the image, the trained neural network predicting multiple trait values for the avatar; and
sending a message with the generated avatar.

2. The example method of claim 1, wherein the generating further comprises generating the avatar based on subtraits.

3. The example method of claim 1, further comprising balancing of a dataset to train the neural network independently across multiple traits.

4. The example method of claim 3, wherein the balancing comprises applying a weight multiplier for each trait value, the weight multiplier is based on an inverse square root of a probability of a given trait value.

5. The example method of claim 1, further comprising filtering a dataset to train the neural network across multiple traits.

6. The example method of claim 5, wherein the filtering includes removing avatars from the dataset that include a default value for a trait.

7. The example method of claim 6, wherein default values for a trait include skin tone, hair style, and pupil tone.

8. The example method of claim 5, wherein the filtering is performed independently for each trait.

9. The example method of claim 5, wherein the filtering filters blacklisted traits.

10. An example machine-readable storage device embodying instructions that, when executed by a machine, cause the machine to perform operations comprising:
receiving an image;
generating an avatar with a trained neural network based on the image, the trained neural network predicting multiple trait values for the avatar; and
sending a message with the generated avatar.

11. An example system, comprising:
one or more processors of a machine; and a memory storing instructions that, when executed by the one or more processors, cause the machine to perform operations comprising:
receiving an image;
generating an avatar with a trained neural network based on the image, the trained neural network predicting multiple trait values for the avatar; and
sending a message with the generated avatar.

12. The example system of claim 11, wherein the generating further comprises generating the avatar based on subtraits.

13. The example system of claim 11, wherein the operations further comprise balancing of a dataset to train the neural network independently across multiple traits.

14. The example system of claim 13, wherein the balancing comprises applying a weight multiplier for each trait value, the weight multiplier is based on an inverse square root of a probability of a given trait value.

15. The example system of claim 11, wherein the operations further comprise filtering a dataset to train the neural network across multiple traits.

16. The example system of claim 15, wherein the filtering includes removing avatars from the dataset that include a default value for a trait.

17. The example system of claim 16, wherein default values for a trait include skin tone, hair style, and pupil tone.

18. The example system of claim 15, wherein the filtering is performed independently for each trait.

19. The example system of claim 15, wherein the filtering filters blacklisted traits.

20. The example system of claim 19, wherein the message is an Ephemeral Message.

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency integrated Circuit (RFIC) or any combination thereof. A processor may further be a multi-core processor having two or more independent processors (sometimes referred to as "cores") that may execute instructions contemporaneously.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein, A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access, For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Client Device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultra-books, netbooks, laptops, multi-processor systems, microprocessor-based or programmable consumer electronics, game consoles, set-top boxes, or any other communication device that a user may use to access a network.

"Ephemeral Message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

What is claimed is:
1. A machine-implemented method, comprising:
receiving paired sets each comprising a self-image and a user-generated avatar linked to that self-image;
forming a dataset comprising the received paired sets;
removing paired sets from the formed dataset for avatars that include a default value for a trait;
training a neural network using the formed dataset with removed paired sets to generate multiple trait values for a first static avatar based on an input facial image;

transferring learning to the trained neural network to introduce new trait values from a new art release dataset such that a learning rate of a bottom layer of the trained neural network is less than a learning rate of a top layer of the trained neural network;

generating, using the trained neural network having the transferred learning and the first input facial image, multiple trait values for the first static avatar including a new trait value from the new art release dataset wherein the new trait value is absent from the formed dataset; and generating the first static avatar based on the multiple trait values.

2. The method of claim 1, wherein the generating the first static avatar is further based on subtraits.

3. The method of claim 1, wherein the training further comprises balancing of the dataset to train the neural network independently across multiple trait values.

4. The method of claim 3, wherein the balancing comprises applying a weight multiplier for each trait value, and the weight multiplier is based on an inverse square root of a probability of a given trait value.

5. The method of claim 1, wherein the training further comprises filtering the dataset to train the neural network across multiple traits.

6. The method of claim 1, wherein default values for a trait include skin tone, hair style, and pupil tone.

7. The method of claim 5, wherein the filtering is performed independently for each trait.

8. The method of claim 5, wherein the filtering removes blacklisted traits.

9. A machine-readable storage device embodying instructions that, when executed by a machine, cause the machine to perform operations comprising:

receiving paired sets each comprising a self-image and a user-generated avatar linked to that self-image;

forming a dataset comprising the received paired sets;

removing paired sets from the formed dataset for avatars that include a default value for a trait;

training a neural network using the formed dataset with removed paired sets to generate multiple trait values for a first static avatar based on an input facial image;

transferring learning to the trained neural network to introduce new trait values from a new art release dataset such that a learning rate of a bottom layer of the trained neural network is less than a learning rate of a top layer of the trained neural network;

generating, using the trained neural network having the transferred learning and the first input facial image, multiple trait values for the first static avatar including a new trait value from the new art release dataset wherein the new trait value is absent from the formed dataset; and generating the first static avatar based on the multiple trait values.

10. A system, comprising:

one or more processors; and a non-transitory memory storing instructions that, when executed by the one or more processors, cause the system to perform operations comprising:

receiving paired sets each comprising a self-image and a user-generated avatar linked to that self-image;

forming a dataset comprising the received paired sets;

removing paired sets from the formed dataset for avatars that include a default value for a trait;

training a neural network using the formed dataset with removed paired sets to generate multiple trait values for a first static avatar based on an input facial image;

transferring learning to the trained neural network to introduce new trait values from a new art release dataset such that a learning rate of a bottom layer of the trained neural network is less than a learning rate of a top layer of the trained neural network;

generating, using the trained neural network having the transferred learning and the first input facial image, multiple trait values for the first static avatar including a new trait value from the new art release dataset wherein the new trait value is absent from the formed dataset; and generating the first static avatar based on the multiple trait values.

11. The system of claim 10, wherein the generating the first static avatar is further based on subtraits.

12. The system of claim 10, wherein the training operation further comprises balancing of a dataset to train the neural network independently across multiple trait values.

13. The system of claim 12, wherein the balancing comprises applying a weight multiplier for each trait value, and the weight multiplier is based on an inverse square root of a probability of a given trait value.

14. The system of claim 10, wherein the training operation further comprises filtering a dataset to train the neural network across multiple traits.

15. The system of claim 14, wherein default values for a trait include skin tone, hair style, and pupil tone.

16. The system of claim 14, wherein the filtering is performed independently for each trait.

17. The system of claim 14, wherein the filtering removes blacklisted traits.

18. The system of claim 17, wherein the operations further comprise transmitting a message including the first generated static avatar, the first generated static avatar identifying a sender of the message.

19. The method of claim 1, wherein the transferring learning includes reconstructing a top layer of the trained neural network maintaining weights of a bottom layer of the trained neural network.

* * * * *